United States Patent
Sugimori (10) Patent No.: US 9,118,878 B2
(45) Date of Patent: *Aug. 25, 2015

(54) IMAGE PROCESSING APPARATUS THAT CORRECTS FOR CHROMATIC ABERRATION FOR TAKEN IMAGE, IMAGE PICKUP APPARATUS, METHOD OF CORRECTING FOR CHROMATIC ABERRATION OF MAGNIFICATION THEREFOR, AND STORAGE MEDIUM

(71) Applicant: CANON KABUSHIKI KAISHA, Tokyo (JP)

(72) Inventor: Masami Sugimori, Yamato (JP)

(73) Assignee: CANON KABUSHIKI KAISHA (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/964,206

(22) Filed: Aug. 12, 2013

(65) Prior Publication Data

US 2013/0329097 A1 Dec. 12, 2013

Related U.S. Application Data

(63) Continuation of application No. 13/237,415, filed on Sep. 20, 2011, now Pat. No. 8,531,579.

(30) Foreign Application Priority Data

Sep. 21, 2010 (JP) ................................. 2010-210744

(51) Int. Cl.
*H04N 5/225* (2006.01)
*H04N 9/07* (2006.01)
*H04N 9/64* (2006.01)

(52) U.S. Cl.
CPC .................................... *H04N 9/646* (2013.01)

(58) Field of Classification Search
CPC ..................................................... H04N 5/3572
USPC ........................................................... 348/335
See application file for complete search history.

(56) References Cited

U.S. PATENT DOCUMENTS 6,852,400 B2 2/2005 Nakazawa et al.
7,339,699 B1 * 3/2008 Suzuki et al. .................. 358/1.9
(Continued)

FOREIGN PATENT DOCUMENTS

JP 2000-299874 A 10/2000
JP 2006-020275 A 1/2006

*Primary Examiner* — Lin Ye
*Assistant Examiner* — Chan Nguyen
(74) *Attorney, Agent, or Firm* — Rossi, Kimms & McDowell LLP (57) ABSTRACT

An image processing apparatus which is capable of accurately correcting for chromatic aberration of magnification in an area peripheral to a taken image using the taken image. Areas including edges in image data are extracted, and the amount of chromatic aberration of magnification is calculated as the amount of area chromatic aberration of magnification in each area with respect to each color component. Based on lens design values, chromatic aberration of magnification in each area is calculated as the amount of lens chromatic aberration of magnification. By using the amount of area chromatic aberration of magnification and the amount of lens chromatic aberration of magnification in adjacent areas next to an indefinite area matching predetermined conditions, the amount of lens chromatic aberration of magnification relating to the indefinite area is corrected to determine the amount of area chromatic aberration of magnification relating to the indefinite area.

16 Claims, 5 Drawing Sheets

(56) References Cited

U.S. PATENT DOCUMENTS

| | | |
|---|---|---|
| 7,770,994 B2 * | 8/2010 | Kitamura et al. ............... 347/15 |
| 2001/0014175 A1 | 8/2001 | Tavor |
| 2004/0096103 A1 | 5/2004 | Gallagher et al. |
| 2007/0116375 A1 * | 5/2007 | Utsugi et al. .................. 382/264 |
| 2008/0170248 A1 * | 7/2008 | Kang et al. .................... 358/1.9 |
| 2010/0027886 A1 | 2/2010 | Kang et al. |
| 2011/0182509 A1 | 7/2011 | Free |
| 2013/0002909 A1 * | 1/2013 | Hara ............................. 348/242 |

\* cited by examiner

IMAGE PROCESSING APPARATUS THAT CORRECTS FOR CHROMATIC ABERRATION FOR TAKEN IMAGE, IMAGE PICKUP APPARATUS, METHOD OF CORRECTING FOR CHROMATIC ABERRATION OF MAGNIFICATION THEREFOR, AND STORAGE MEDIUM

BACKGROUND OF THE INVENTION

1. Field of the Invention

The present invention relates to an image processing apparatus and an image pickup apparatus, and more particularly to an image processing apparatus for correcting for chromatic aberration of magnification for a taken image, an image pickup apparatus, a method of correcting for chromatic aberration of magnification, and a computer-readable storage medium storing a program for correcting for chromatic aberration of magnification.

2. Description of the Related Art

In general, in image pickup apparatuses such as digital cameras, a color shift appears in a taken image due to chromatic aberration of magnification occurring in an image-forming optical system such as an image pickup lens. The color shift may lead to a considerable degradation in the quality of the taken image.

On the other hand, the number of pixels in an image pickup device used in image pickup apparatuses such as digital cameras increases year by year, and unit pixel size tends to decrease. Thus, even with chromatic aberration of magnification at such a level as to pose little problem in the past, a color shift may degrade the quality of a taken image.

To correct for a color shift in a taken image, for example, it is known that the amount of chromatic aberration of magnification is detected according to the distance from a reference position to the taken image, and chromatic aberration is corrected based on the detected amount of chromatic aberration of magnification. Here, a position at which the sum of differences between color components is the minimum is searched for to obtain the amount of color shift at that position (see, for example, Japanese Laid-Open Patent Publication No. 2000-299874).

Further, it is known that RAW data comprised of pixel arrays of a plurality of types color components in a predetermined array pattern is taken in, and the correlation between two types of color components included in the RAW data is calculated to detect the width of color shift (the amount of color shift). Here, based on the width of color shift, the amount of chromatic aberration of magnification in an image-forming optical system that has taken an image (see, for example, Japanese Laid-Open Patent Publication No. 2006-20275).

Chromatic aberration of magnification occurs due to focus positions of respective color wavelengths differing according to image height from the center of an optical axis of an image-forming optical system such as an image pickup lens toward an area peripheral to the image-forming optical system. Chromatic aberration of magnification varies with image-forming optical systems such as image pickup lenses, and does not have only a feature of monotonously increasing from the center of an optical axis toward an area peripheral to that.

Figure 6:
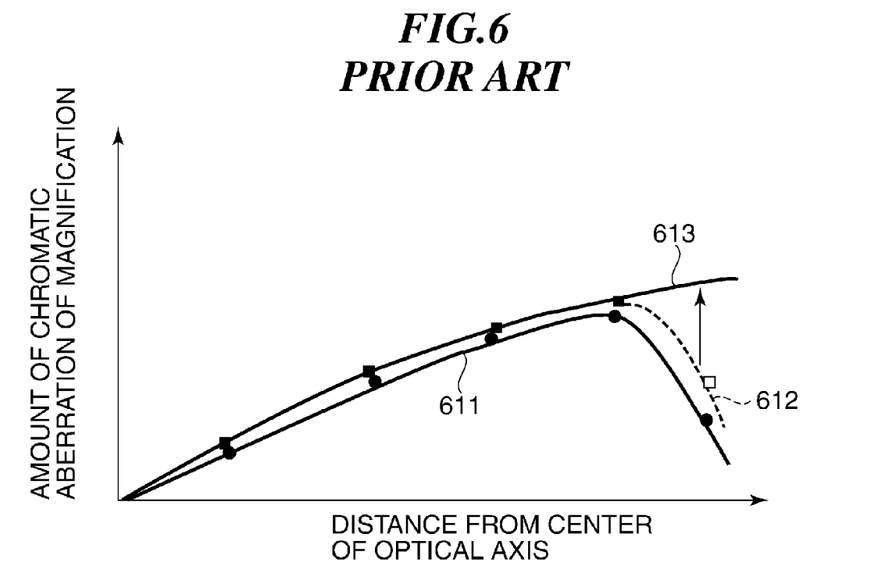
FIG. 6 is a diagram showing the amount of shift of red or blue focus position relative to green that is a representative value of a color filter used for an image pickup device of a digital camera.

FIG. 6 is a diagram showing the amount of shift in red or blue focus position relative to green that is a representative value of a color filter used in an image pickup device such as a digital camera.

Referring to FIG. 6, the amount of shift in focus, that is, the amount of chromatic aberration of magnification may not be proportional to the distance from the center of an optical axis (that is, image height). In other words, the amount of chromatic aberration of magnification may not monotonously increase as the distance from the center of an optical axis increases.

When the amount of chromatic aberration of magnification is to be detected and corrected in each area of a taken image in the case where the amount of chromatic aberration of magnification is not proportional to the distance from the center of an optical axis as mentioned above, edges of a subject may not be detected depending on conditions of the subject such as the sky. For this reason, the amount of correction for the amount of chromatic aberration of magnification may not be obtained from the taken image.

In any case, when the amount of chromatic aberration of magnification is not proportional to the distance from the center of an optical axis, chromatic aberration of magnification may be corrected using an inappropriate amount of correction depending on conditions of a subject. For example, as shown in FIG. 6, assume that the actual amount of chromatic aberration of magnification changes as indicated by black circles 611 according to the distance from the center of an optical axis (image height) (the black circles indicate the relationship between image height and the amount of chromatic aberration of magnification according to lens design data).

In this case, when the amount of chromatic aberration of magnification is detected from a taken image (indicated by square black marks), the amount of chromatic aberration of magnification should change as indicated by a broken line 612 in an area peripheral to the taken image. However, because only a small number of edges are detected from a subject such as the sky as described above, data obtained from this area is unreliable. For this reason, the amount of chromatic aberration of magnification for the entire taken image is determined without using that data.

As a result, as indicated by a solid line 613 in FIG. 6, the amount of chromatic aberration of magnification is determined using square black marks (detected values) in the area peripheral to the taken image. Thus, in the area peripheral to the taken image, a larger amount of correction for the chromatic aberration of magnification than a desired amount of correction for the chromatic aberration of magnification is determined. Therefore, excessive correction is performed in the area peripheral to the taken image.

Further, when chromatic aberration of magnification is to be corrected using lens design values relating to an image-forming optical system such as an image pickup lens, there may be a case where an accurate amount of correction for chromatic aberration of magnification cannot be determined due to manufacturing errors in the image-forming optical system such as an image pickup lens, shooting conditions, and so on. In this case, the amount of correction for chromatic aberration of magnification is determined to be small, and hence chromatic aberration of magnification cannot be satisfactorily corrected.

SUMMARY OF THE INVENTION

The present invention provides an image processing apparatus capable of, in correcting for chromatic aberration of magnification using a taken image, accurately correcting for chromatic aberration of magnification in an area peripheral to the taken image, an image pickup apparatus, a method of correcting for chromatic aberration of magnification, and a computer-readable storage medium storing a program for correcting for chromatic aberration of magnification.

Accordingly, a first aspect of the present invention provides an image processing apparatus that corrects for chromatic aberration of magnification for image data that is obtained through an image-forming optical system having an image pickup lens and has color signals of a plurality of colors, comprising an edge extraction unit configured to extract areas including edge portions in the image data, a first calculation unit configured to calculate an amount of chromatic aberration of magnification as an amount of area chromatic aberration of magnification in each of the areas with respect to each color component according to the color signals, a second calculation unit configured to, based on lens design values relating to lenses provided in the image-forming optical system, calculate chromatic aberration of magnification in each of the areas as an amount of lens chromatic aberration of magnification, and a determination unit configured to, by using the amount of area chromatic aberration of magnification and the amount of lens chromatic aberration of magnification in adjacent areas next to an indefinite area matching conditions prescribed in advance, correct the amount of lens chromatic aberration of magnification relating to the indefinite area to determine the amount of area chromatic aberration of magnification relating to the indefinite area.

Accordingly, a second aspect of the present invention provides an image pickup apparatus comprising an image forming apparatus according to claim 1, an image-forming optical system configured to have an image pickup lens and take an image of a subject, an image pickup device on which an optical image is formed by the image-forming optical system to obtain an electric signal according to the optical image, and an analog-to-digital conversion unit configured to carry out analog-to-digital conversion of the electric signal into image data.

Accordingly, a third aspect of the present invention provides a chromatic-aberration-of-magnification method for correcting for chromatic aberration of magnification for image data that is obtained through an image-forming optical system having an image pickup lens and has color signals of a plurality of colors, comprising an edge extraction step of extracting areas including edge portions in the image data, a first calculation step of calculating an amount of chromatic aberration of magnification as an amount of area chromatic aberration of magnification in each of the areas with respect to each color component according to the color signals, a second calculation step of, based on lens design values relating to lenses provided in the image-forming optical system, calculating chromatic aberration of magnification in each of the areas as an amount of lens chromatic aberration of magnification, and a determination step of, by using the amount of area chromatic aberration of magnification and the amount of lens chromatic aberration of magnification in adjacent areas next to an indefinite area matching conditions prescribed in advance, correcting the amount of lens chromatic aberration of magnification relating to the indefinite area to determine the amount of area chromatic aberration of magnification relating to the indefinite area.

Accordingly, a fourth aspect of the present invention provides a computer-readable non-transitory storage medium storing a chromatic-aberration-of-magnification method for correcting for chromatic aberration of magnification for image data that is obtained through an image-forming optical system having an image pickup lens and has color signals of a plurality of colors, the method comprising an edge extraction step of extracting areas including edge portions in the image data, a first calculation step of calculating an amount of chromatic aberration of magnification as an amount of area chromatic aberration of magnification in each of the areas with respect to each color component according to the color signals, a second calculation step of, based on lens design values relating to lenses provided in the image-forming optical system, calculating chromatic aberration of magnification in each of the areas as an amount of lens chromatic aberration of magnification, and a determination step of, by using the amount of area chromatic aberration of magnification and the amount of lens chromatic aberration of magnification in adjacent areas next to an indefinite area matching conditions prescribed in advance, correcting the amount of lens chromatic aberration of magnification relating to the indefinite area to determine the amount of area chromatic aberration of magnification relating to the indefinite area.

According to the present invention, because the amount of chromatic aberration of magnification in an indefinite area is determined by correcting the amount of lens chromatic aberration of magnification regarding the indefinite area using the amount of area chromatic aberration of magnification in adjacent areas next to the indefinite area as well as the amount of lens aberration of magnification, chromatic aberration of magnification can be accurately corrected even in an area peripheral to a taken image when the chromatic aberration of magnification is corrected using a taken image.

Further features of the present invention will become apparent from the following description of exemplary embodiments (with reference to the attached drawings).

BRIEF DESCRIPTION OF THE DRAWINGS

FIGS. 3A and 3B are diagrams showing exemplary histograms of chromatic aberration of magnification calculated by an image correction amount calculation unit appearing in FIG. 1, in which FIG. 3A shows a state in which the amount of chromatic aberration of magnification has a peak in a specific area, and FIG. 3B shows a case where the amount of chromatic aberration of magnification is affected by noise or the like.

FIGS. 4A and 4B are diagrams showing exemplary correction data according to image height obtained in line with the flowchart of FIG. 2, in which FIG. 4A shows areas split for respective image heights, and FIG. 4B shows correction data according to image height.

DESCRIPTION OF THE EMBODIMENTS

A description will now be given of an image processing apparatus according to an embodiment of the present invention with reference to the drawings.

Figure 1:
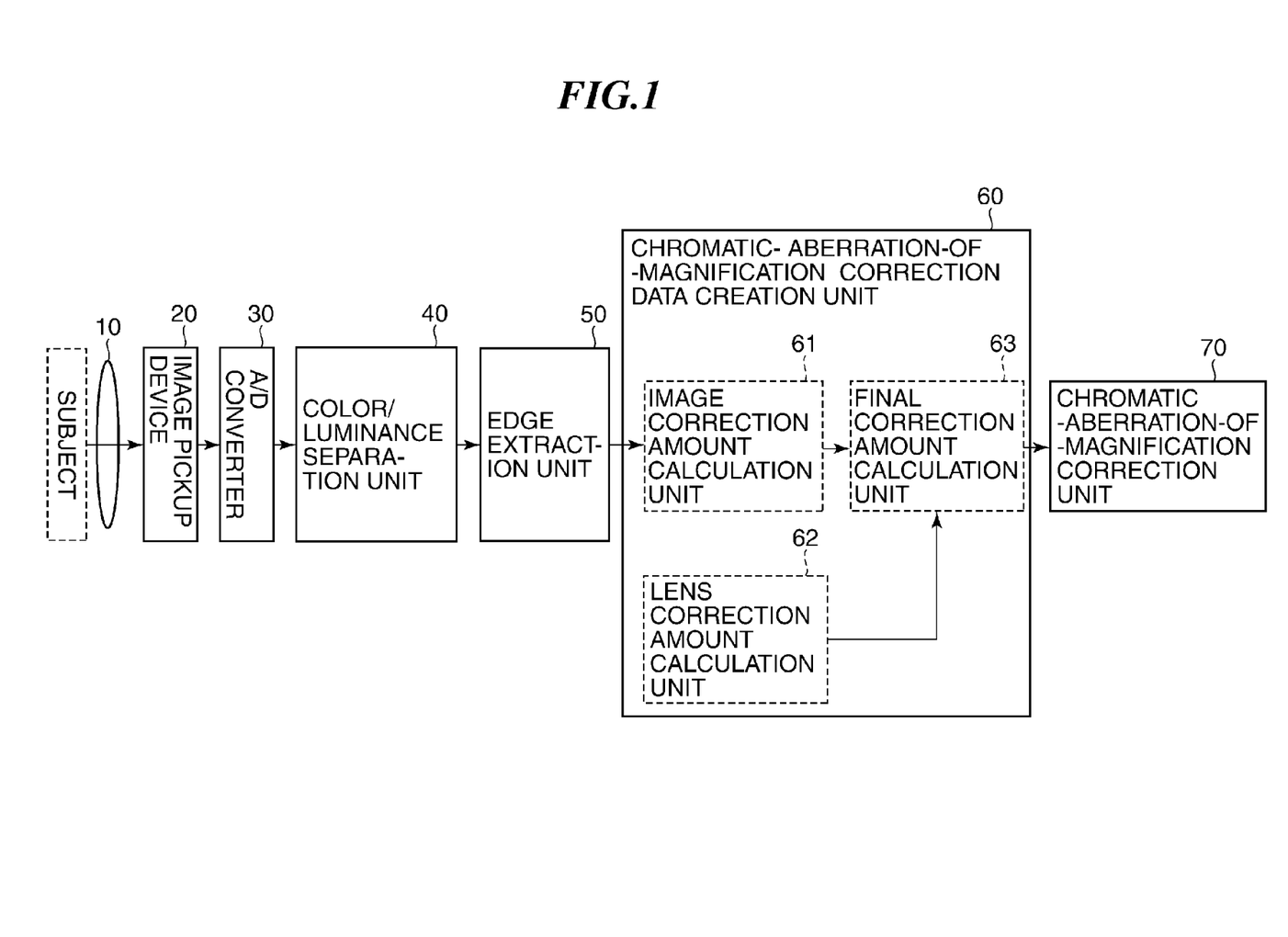
FIG. 1 is a block diagram showing an exemplary image pickup apparatus for which an image processing apparatus according to an embodiment of the present invention is used.

FIG. 1 is a block diagram showing an exemplary image pickup apparatus for which an image processing apparatus according to an embodiment of the present invention is used.

In the following description, even when no particular reference is made to color planes (color signals), color shift between a G (green) plane and an R (red) plane and color shift between the G plane and a B (blue) plane are corrected for in the same way.

Although an image pickup apparatus such as a digital camera is taken as an example here, the image processing apparatus can be applied to a taken image having a plurality of color planes (color signals of a plurality of colors) and taken by an image pickup apparatus such as a digital camera.

Therefore, the image processing apparatus according to the present embodiment can also be applied to RAW data (unprocessed image data), JPEG (joint photographic experts group) data after development, or the like.

Referring to FIG. 1, the image pickup apparatus shown in the figure has an image-forming optical system 10 having an image pickup lens (also referred to as a taking lens), an image pickup device 20, an A/D converter 30, a color/luminance separation unit 40, an edge extraction unit 50, a chromatic-aberration-of-magnification correction data creation unit 60, and a chromatic-aberration-of-magnification correction unit 70. The chromatic-aberration-of-magnification correction data creation unit 60 has an image correction amount calculation unit 61, a lens correction amount calculation unit 62, and a final correction amount calculation unit 63.

When a subject is to be shot, an optical image of the subject is formed on the image pickup device 20 through the image-forming optical system 10. The image pickup device 20 then carries out photoelectric conversion of the optical image to output an electric signal according to the optical image.

In the example shown in the figure, the image pickup device 20 is a single plate color image pickup device having a primary color filter. The primary color filter is comprised of three types of color filters having transparent dominant wavelength bands close to 650 nm, 550 nm, and 450 nm. The three types of color filters take color planes (a taken image having color signals of a plurality of colors) corresponding to R (red), G (green), and B (blue) bands (wavelength bands).

In the single plate color image pickup device 20, those color filters are spatially arrayed in pixels. Thus, in each pixel, only intensity in a single color plane can be obtained, an electric signal output from the image pickup device 20 represents a color mosaic image.

The A/D converter (analog-to-digital converter) 30 carries out A/D conversion (analog-to-digital conversion) of an electric signal output from the image pickup device 20 to obtain digital data (image data). The image data is then supplied to the color/luminance separation unit 40.

First, the color/luminance separation unit 40 interpolates a color mosaic image represented by the image data to generate color image data having R, G, and B color information (color signals) in each of all the pixels.

It should be noted that various methods such as bilinear interpolation and bicubic interpolation are known as interpolation methods used by the color/luminance separation unit 40. In the example shown in the figure, interpolation methods are not limited.

Further, the color/luminance separation unit 40 creates a luminance signal from the color image data of the R, G, and B colors. The color/luminance separation unit 40 supplies the color image data and the luminance signal to the edge extraction unit 50.

Concerning a color image represented by the color image data, the edge extraction unit 50 detects edges thereof based on a luminance signal to obtain edge information. Then, based on the edge information, the chromatic-aberration-of-magnification correction data creation unit 60 creates chromatic-aberration-of-magnification correction data from the color image as described later. The chromatic-aberration-of-magnification correction data is supplied to the chromatic-aberration-of-magnification correction unit 70, which in turn corrects for chromatic aberration of magnification on the image data using the chromatic-aberration-of-magnification correction data.

Figure 2:
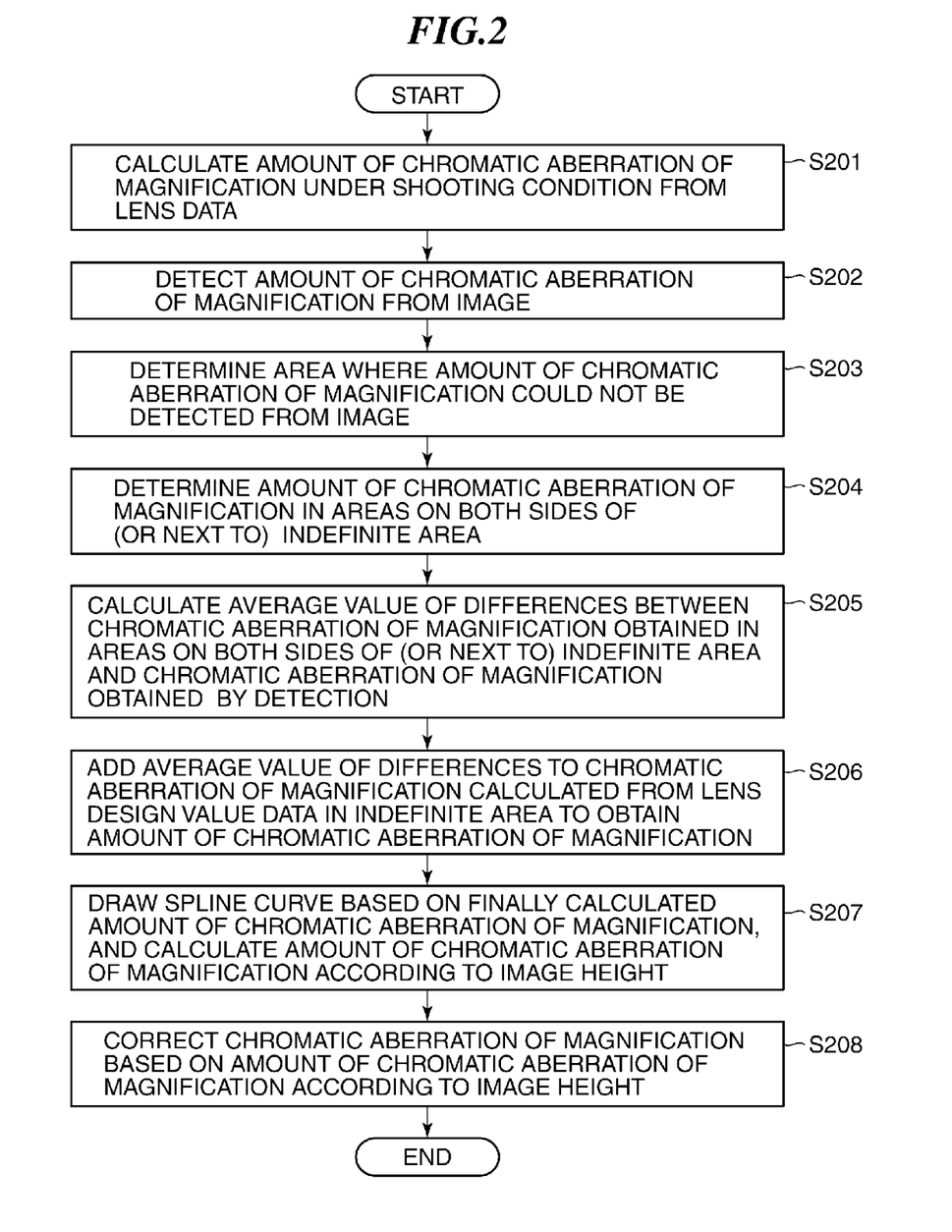
FIG. 2 is flowchart useful in explaining processes carried out by a chromatic-aberration-of-magnification correction data creation unit and a chromatic-aberration-of-magnification correction unit.

FIG. 2 is flowchart useful in explaining processes carried out by the chromatic-aberration-of-magnification correction data creation unit 60 and the chromatic-aberration-of-magnification correction unit 70 appearing in FIG. 1.

As shown in FIGS. 1 and 2, lens design value data (also referred to merely as lens design values) on lenses used in the image-forming optical system 10, in particular, the image pickup lens are set in advance in the lens correction amount calculation unit 62.

Although not shown in the figure, the lens correction amount calculation unit 62 is supplied with the distance between a subject and a digital camera (that is, the image pickup lens) (lens distance), focal length, and aperture value at the time of shooting.

Based on the lens design value data, the lens correction amount calculation unit 62 calculates the amount of lens-specific chromatic aberration of magnification (referred to as the amount of lens chromatic aberration of magnification) according to the lens distance, focal length, and aperture value (step S201).

Then, concerning edge portions (hereafter referred to as edges) extracted by the edge extraction unit 50, the image correction amount calculation unit 61 calculates the amount of chromatic aberration of magnification according to color signals with respect to each color component. Specifically, the image correction amount calculation unit 61 sets an area with such a size as to include an edge in the direction of image light, and carries out interpolation to synchronize color information pieces of respective colors in this area, thus providing each pixel with color information on both R and G. The image correction amount calculation unit 61 normalizes levels of the G color information and the R color information so that an average value of levels of the G color information and an average value of levels of the R color information can be equal to each other after synchronization in this area. While shifting the position of the R color information in the direction of image height relative to the position of the G color information, the image correction amount calculation unit 61 obtains the sum of differences in level between the G color information and the R color information in respective pixels within the area at positions to which the G color information and the R color information have been shifted. Then, the image correction amount calculation unit 61 regards the amount of movement of the R color information in the direction of image height at the time the sum becomes the minimum as the amount of chromatic aberration of magnification.

Then, the image correction amount calculation unit 61 obtains chromatic aberration of magnification with respect to each area (hereafter referred to as the amount of area chromatic aberration of magnification) (step S202).

Next, the image correction amount calculation unit 61 identifies an area where the number of edges extracted by the edge extraction unit 50 is smaller than a predetermined number as an indefinite area (step S203). Namely, the image correction amount calculation unit 61 identifies an area where the amount of chromatic aberration of magnification cannot be detected from color image data.

It should be noted that the image correction amount calculation unit 61 may regard an area where it is determined that chromatic aberration of magnification cannot be accurately found due to variations in chromatic aberration of magnification as an indefinite area.

Figure 3A:
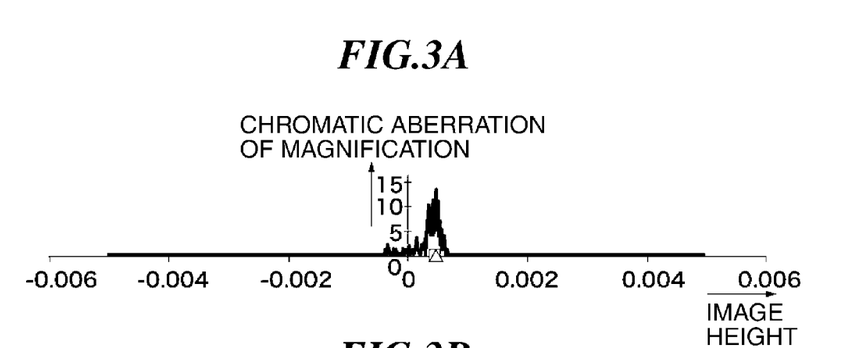
Figure 3B:
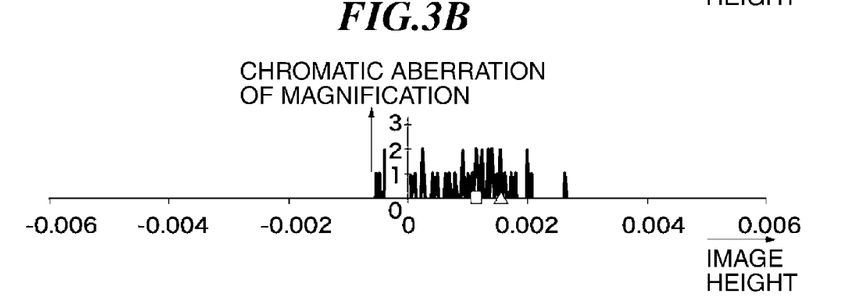

FIGS. 3A and 3B are diagrams showing exemplary histograms of chromatic aberration of magnification calculated by the image correction amount calculation unit 61 appearing in FIG. 1. FIG. 3A is a diagram showing a state in which the amount of chromatic aberration of magnification has a peak in a specific area, and FIG. 3B is a diagram showing a case where the amount of chromatic aberration of magnification is affected by noise or the like.

When the amount of chromatic aberration of magnification has a peak in a specific area as shown in FIG. 3A, the amount of shift in peak position can be regarded as the amount of chromatic aberration of magnification in this area.

On the other hand, when the amount of chromatic aberration of magnification has peaks in a plurality of areas as shown in FIG. 3B, the amount of chromatic aberration of magnification is thought to be affected by noise, image, and so on. Thus, in this case, the amount of chromatic aberration of magnification cannot be accurately determined in a specific area.

Therefore, in the state shown in FIG. 3B, when an average or the like of the amounts of chromatic aberration of magnification is obtained so as to determine the amount of chromatic aberration of magnification, the average considerably differs from the actual amount of chromatic aberration of magnification.

To prevent such a problem, by calculating an average value and a variance value with respect to the amount of chromatic aberration of magnification, the degree to which the amount of chromatic aberration of magnification obtained in a specific area is accurate can be determined. Here, when the variance value is greater than a value prescribed in advance, it is determined that the amount of chromatic aberration of magnification in the specific area is indefinite.

Referring again to FIGS. 1 and 2, the final correction amount calculation unit 63 determines the amount of chromatic aberration of magnification (the amount of lens chromatic aberration of magnification) obtained according to lens design value data in areas (adjacent areas) on both sides or next to the area determined to be indefinite (indefinite area) so as to obtain the amount of chromatic aberration of magnification (the amount of lens chromatic aberration of magnification) in the area determined to be indefinite (step S204).

Then, the final correction amount calculation unit 63 obtains differences between the amount of chromatic aberration of magnification (the amount of area chromatic aberration of magnification) determined in the step S202 and the amount of lens chromatic aberration of magnification determined in the step S204 in the areas (adjacent areas) on both sides or next to the area determined to be indefinite (indefinite area), and averages the differences to obtain an average difference value (step S205).

Next, regarding the area determined to be indefinite, the final correction amount calculation unit 63 adds the average difference value to the amount of lens chromatic aberration of magnification relating to this area, and thus obtains the amount of area chromatic aberration of magnification in the area determined to be indefinite (step S206). Then, the final correction amount calculation unit 63 draws a spline curve of the amount of chromatic aberration of magnification with respect to each area using a spline function to obtain the amount of chromatic aberration of magnification according to the distance from the center of an optical axis (that is, image height) (step S207).

The amount of chromatic aberration of magnification according to image height is supplied as correction data from the final correction amount calculation unit 63 to the chromatic-aberration-of-magnification correction unit 70.

Figure 4A:
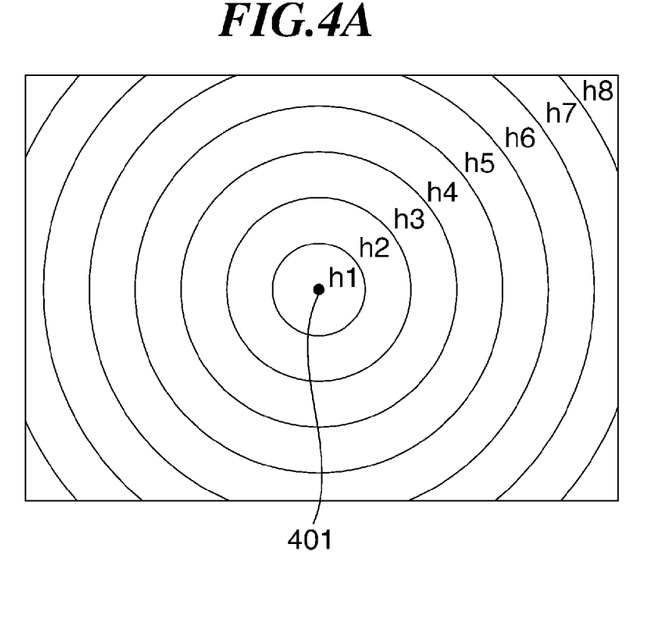
Figure 4B:
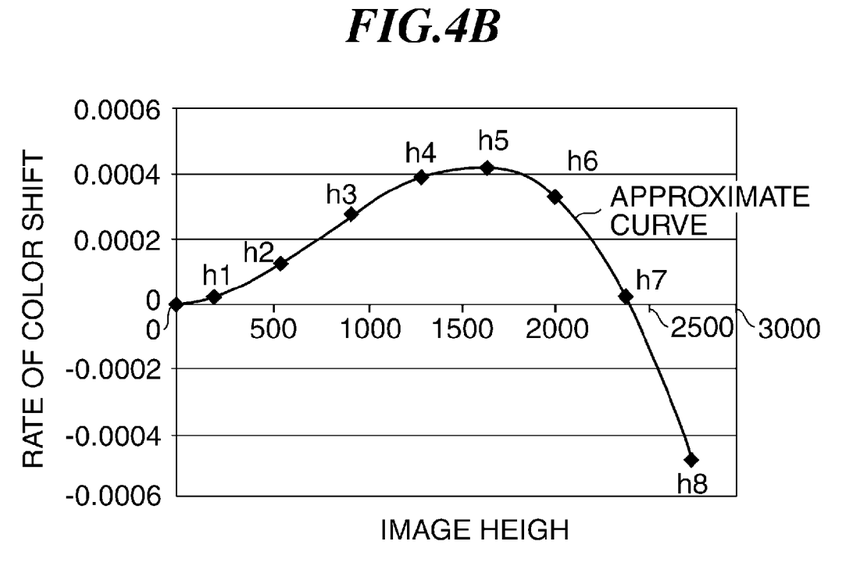

FIGS. 4A and 4B are diagrams showing exemplary correction data according to image height obtained in line with the flowchart of FIG. 2. FIG. 4A shows areas split according to respective image heights, and FIG. 4B shows correction data according to image height.

In FIG. 4A, for a taken image including the sky and others, concentric circles are drawn around an optical axis center 401, and areas surrounded by these concentric circles are designated by respective image heights h1 and h8.

When correction data (that is, the amount of chromatic aberration of magnification (also referred to as the amount of color shift)) is obtained for the taken image as described above, a spline curve (approximate curve) thereof is as shown in FIG. 4B.

As shown in FIG. 4B, in the taken image including the sky and others, the amount of color shift gradually increases on the positive (+) side as image height increases. Then, the amount of color shift reaches its maximum near the image height h5, and thereafter, the amount of color shift gradually decreases.

In FIG. 4B, the amount of color shift becomes nearly zero around the image height h7, and thereafter, the amount of color shift considerably decreases on the negative (−) side. The approximate curve shown in FIG. 4B is very close to a change curve of the amount of chromatic aberration of magnification in a taken image including the sky and others shown in FIG. 6. Thus, it is clear that by obtaining correction data as described with reference to FIG. 2, the exact amount of color shift can be obtained.

According to the correction data, the chromatic-aberration-of-magnification correction unit 70 multiplies the R plane and the B plane obtained by the color/luminance separation unit 40 by variable magnification to correct chromatic aberration of magnification for the taken image (step S208). Then, the image pickup apparatus completes the correction of chromatic aberration of magnification for the image to an end.

A description will now be given of the calculation of the average difference value (step S205) and the calculation of the amount of area chromatic aberration of magnification in an indefinite area (step S206) described with reference to FIG. 2.

Figure 5:
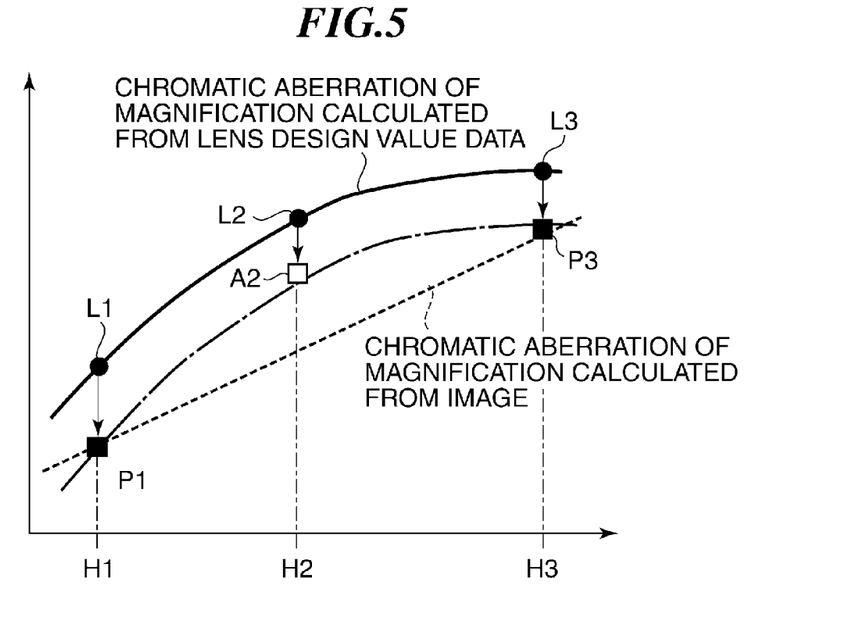
FIG. 5 is a diagram useful in explaining how an average difference value is calculated, and how the amount of area chromatic aberration of magnification in an indefinite area is calculated.

FIG. 5 is a diagram useful in explaining the calculation of the average difference value (step S205) and the calculation of the amount of area chromatic aberration of magnification in an indefinite area (step S206) described with reference to FIG. 2.

When the amount of chromatic aberration of magnification is to be detected from a taken image, there must be a predetermined number of edges in the concerned area. If the amount of chromatic aberration of magnification is determined for an area when the number of edges is smaller than a predetermined number, the amount of chromatic aberration of magnification is affected by noise and an image itself as described earlier. As a result, the amount of chromatic aberration of magnification cannot be accurately calculated.

Referring to FIG. 5, when the number of edges in an area H2 is smaller than a predetermined number, the area H2 is determined to be an indefinite area as described earlier. In a case where the area H2 is determined to be an indefinite area, when spline interpolation is carried out without using chromatic aberration of magnification in the area H2, the amount of chromatic aberration of magnification is as represented by a dotted line in FIG. 5 connecting the amount of chromatic aberration of magnification P1 in an area H1 to the amount of chromatic aberration of magnification P3 in an area H3.

Actually, however, it is believed that the amount of chromatic aberration should be close to a curve obtained by interpolation using the amounts of lens chromatic aberration of magnification L1, L2, and L3 in the areas H1, H2, and H3. Thus, if this goes on, correction for the area H2 is insufficient, and hence the amount of area chromatic aberration of magnification A2 in the area H2 is estimated from lens design value data.

First, by using the amounts of lens chromatic aberration of magnification L1 and L3 obtained from lens design value data and the amounts of area chromatic aberration of magnification P1 and P3 detected from a taken image, a difference 1 and a difference 3 are obtained using equations (1) and (2), respectively.

$$\text{Difference } 1 = L1 - P1 \quad (1)$$

$$\text{Difference } 3 = L3 - P3 \quad (2)$$

Then, to calculate the amount of area chromatic aberration of magnification A2 in the area H2, an average of the difference 1 and the difference 3 is calculated using an equation (3).

$$\text{Difference} = (\text{difference } 1 + \text{difference } 3)/2 \quad (3)$$

Next, the difference obtained using the equation (3) is added to the amount of lens chromatic aberration of magnification L2 obtained from lens design value data with respect to the area H2 (equation (4)). As a result, the amount of area chromatic aberration of magnification A2 in the area H2 is determined.

$$A2 = L2 + \text{difference} \quad (4)$$

If the amount of area chromatic aberration of magnification is obtained for the indefinite area H2 in the above described way, a curve of the amount of chromatic aberration of magnification indicated by the dotted line in FIG. 5 will become a curve of the amount of chromatic aberration of magnification indicated by an alternate long and short dash line in FIG. 5. As a result, a curve of the amount of chromatic aberration of magnification can be bring close to a curve of the amount of chromatic aberration of magnification obtained from lens design value data.

As described above, according to the present embodiment, the amount of area chromatic aberration of magnification in an indefinite area is determined by correcting the amount of lens chromatic aberration of magnification in the indefinite area using the amount of area chromatic aberration of magnification in an adjacent area next to the indefinite area and the amount of lens chromatic aberration of magnification in the indefinite area.

Thus, when chromatic aberration of magnification is to be corrected using a taken image, chromatic aberration of magnification can be accurately corrected even in an area peripheral to the taken image.

As is clear from the above description, the edge extraction unit 50 appearing in FIG. 1 acts as an edge extraction unit. The image correction amount calculation unit 61 acts as a first calculation unit, and the lens correction amount calculation unit 62 acts as a second calculation unit. The final correction amount calculation unit 63 acts as a determination unit.

Further, in the image pickup apparatus (digital camera) appearing in FIG. 1, the color/luminance separation unit 40, the edge extraction unit 50, the chromatic-aberration-of-magnification correction data creation unit 60, and the chromatic-aberration-of-magnification correction unit 70 constitute the image processing apparatus. An indefinite area mentioned above is an area matching conditions prescribed in advance.

Although in the examples described above, when the number of edges in an area is smaller than a predetermined number, the area is determined to be an indefinite area, but when a variance value of the amount of area chromatic aberration of magnification in an area is greater than a predetermined variance value, the area may be determined to be an indefinite area.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. This application claims the benefit of Japanese Patent Application No. 2010-210744 filed Sep. 21, 2010, which is hereby incorporated by reference herein in its entirety.

What is claimed is:

1. An image processing apparatus that corrects for chromatic aberration of magnification for image data that is obtained through an image-forming optical system having an image pickup lens and has color signals of a plurality of colors, comprising:
   a correction amount obtaining unit configured to obtain an amount of chromatic aberration of magnification;
   wherein the correction amount obtaining unit obtains, at a first position on the image data at which conditions prescribed in advance are matched, a correction amount of the chromatic aberration of magnification by using an image data of an area including the first position, and obtains, at a second position on the image data at which conditions prescribed in advance are not matched, the correction amount of the chromatic aberration of magnification by using an amount of a chromatic aberration of magnification obtained from lens design value data.

2. An image processing apparatus according to claim 1, wherein the first position is included in an area at which not less than a predetermined number of edges are extracted.

3. An image processing apparatus according to claim 1, wherein the first position is included in an area of which a variance value of an amount of the chromatic aberration of magnification obtained by using the image data is equal to or less than a predetermined value.

4. An image processing apparatus according to claim 1, wherein the correction amount obtaining unit obtains, in an area including the first position, amount of shift between an image data comprised of a first color included in the plurality of colors and an image data comprised of a second color included in the plurality of colors, and subsequently obtains the correction amount of the chromatic aberration of magnification at the first position based on the obtained amount of shift.

5. An image processing apparatus according to claim 1, wherein the correction amount obtaining unit obtains, at the first position, the correction amount of the chromatic aberration of magnification by using the image data of the area including the first position without using the amount of the chromatic aberration of magnification obtained from the lens design value data, and obtains, at the second position, the correction amount of the chromatic aberration of magnification by using the amount of the chromatic aberration of magnification obtained from the lens design value data and the image data of the area including the first position.

6. An image processing apparatus according to claim 5, wherein the correction amount obtaining unit obtains, at the second position, the correction amount of the chromatic aberration of magnification by using an amount of the chromatic aberration of magnification obtained from the lens design value data at the second position, an amount of the chromatic aberration of magnification obtained from the lens design value data at the first position, and the image data of the area including the first position.

7. An image processing apparatus according to claim 5, wherein the correction amount obtaining unit obtains, at the first position, the correction amount of the chromatic aberration of magnification by adding a difference between an amount of the chromatic aberration of magnification obtained from the lens design value data at the first position and an amount of a chromatic aberration of magnification obtained by using the image data of an area including the first position, to the chromatic aberration of magnification, which is obtained at the second position, obtained from the lens design value data.

8. An image pickup apparatus comprising:
an image forming apparatus according to claim 1;
an image-forming optical system configured to have an image pickup lens and take an image of a subject;
an image pickup device on which an optical image is formed by the image-forming optical system to obtain an electric signal according to the optical image; and
an analog-to-digital conversion unit configured to carry out analog-to-digital conversion of the electric signal into image data.

9. An image processing method for correcting for chromatic aberration of magnification for image data that is obtained through an image-forming optical system having an image pickup lens and has color signals of a plurality of colors, the chromatic-aberration-of-magnification method comprising:
a correction amount obtaining step of obtaining an amount of chromatic aberration of magnification;
wherein the correction amount obtaining step obtains, at a first position on the image data at which conditions prescribed in advance are matched, a correction amount of the chromatic aberration of magnification by using an image data of an area including the first position, and obtains, at a second position on the image data at which conditions prescribed in advance are not matched, the correction amount of the chromatic aberration of magnification by using an amount of a chromatic aberration of magnification obtained from lens design value data.

10. A non-transitory computer-readable storage medium storing a program causing a computer to implement an image processing method for correcting for chromatic aberration of magnification for image data that is obtained through an image-forming optical system having an image pickup lens and has color signals of a plurality of colors, the image processing method comprising:
a correction amount obtaining step of obtaining an amount of chromatic aberration of magnification;
wherein the correction amount obtaining step obtains, at a first position on the image data at which conditions prescribed in advance are matched, a correction amount of the chromatic aberration of magnification by using an image data of an area including the first position, and obtains, at a second position on the image data at which conditions prescribed in advance are not matched, the correction amount of the chromatic aberration of magnification by using an amount of a chromatic aberration of magnification obtained from lens design value data.

11. An image processing apparatus that corrects for chromatic aberration of magnification for image data that is obtained through an image-forming optical system having an image pickup lens and has color signals of a plurality of colors, comprising:
a correction amount obtaining unit configured to obtain an amount of chromatic aberration of magnification;
wherein the correction amount obtaining unit obtains, at a first position on the image data at which conditions prescribed in advance are matched, a correction amount of the chromatic aberration of magnification by using the image data, and-obtains, at a second position on the image data at which conditions prescribed in advance are not matched, the correction amount of the chromatic aberration of magnification by using an amount of a chromatic aberration of magnification obtained from lens design value data and the image data.

12. An image processing apparatus according to claim 11, wherein the first position is included in an area at which not less than a predetermined number of edges are extracted.

13. An image processing apparatus according to claim 11, wherein the first position is included in an area of which a variance value of an amount of the chromatic aberration of magnification obtained by using the image data is equal to or less than a predetermined value.

14. An image processing apparatus according to claim 11, wherein the correction amount obtaining unit obtains, in an area including the first position, amount of shift between an image data comprised of a first color included in the plurality of colors and an image data comprised of a second color included in the plurality of colors, and subsequently obtains the correction amount of the chromatic aberration of magnification at the first position based on the obtained amount of shift.

15. A method of controlling an image processing apparatus that corrects for chromatic aberration of magnification for image data that is obtained through an image-forming optical system having an image pickup lens and has color signals of a plurality of colors, the method comprising:
a correction amount obtaining step of obtaining an amount of chromatic aberration of magnification;
wherein the correction amount obtaining step obtains, at a first position on the image data at which conditions prescribed in advance are matched, a correction amount of the chromatic aberration of magnification by using the image data, and-obtains, at a second position on the image data at which conditions prescribed in advance are not matched, the correction amount of the chromatic aberration of magnification by using an amount of a chromatic aberration of magnification obtained from lens design value data and the image data.

16. A non-transitory computer-readable storage medium, storing a program that, when executed by a computer, causes the computer to perform a method of controlling an image processing apparatus that corrects for chromatic aberration of magnification for image data that is obtained through an image-forming optical system having an image pickup lens and has color signals of a plurality of colors, the method comprising:
a correction amount obtaining step of obtaining an amount of chromatic aberration of magnification;
wherein the correction amount obtaining step obtains, at a first position on the image data at which conditions prescribed in advance are matched, a correction amount of the chromatic aberration of magnification by using the image data, and-obtains, at a second position on the image data at which conditions prescribed in advance are not matched, the correction amount of the chromatic aberration of magnification by using an amount of a chromatic aberration of magnification obtained from lens design value data and the image data.

* * * * *